United States Patent
Sharma

(12) 
(10) Patent No.: US 6,792,555 B2
(45) Date of Patent: Sep. 14, 2004

(54) ACCESS SERVER FAULT ISOLATION WITHOUT SERVICE DISRUPTION METHOD AND APPARATUS

(75) Inventor: Mukul Sharma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 560 days.

(21) Appl. No.: 09/938,336

(22) Filed: Aug. 23, 2001

(65) Prior Publication Data

US 2003/0041153 A1 Feb. 27, 2003

(51) Int. Cl.[7] .............................................. G06F 11/00
(52) U.S. Cl. ............................ 714/4; 714/27; 370/241; 379/15.01
(58) Field of Search .................... 714/27, 26, 4, 714/43; 370/241, 251; 379/221.01, 221.06, 221.07, 265.09, 15.01, 9.03

(56) References Cited

U.S. PATENT DOCUMENTS

| | | | | |
|---|---|---|---|---|
| 5,220,560 A | * | 6/1993 | Ogasawara | 370/466 |
| 6,415,392 B1 | * | 7/2002 | Suzuki et al. | 714/27 |
| 6,654,348 B1 | * | 11/2003 | Doty et al. | 370/244 |
| 6,654,914 B1 | * | 11/2003 | Kaffine et al. | 714/43 |
| 2002/0091969 A1 | * | 7/2002 | Chen et al. | 714/43 |

* cited by examiner

Primary Examiner—Robert Beausoliel
Assistant Examiner—Marc M Duncan
(74) Attorney, Agent, or Firm—Marger Johnson & McCollom, PC

(57) ABSTRACT

The invention is a fault isolation method and apparatus for use in a network access server. The method includes allocating one or more modems in a group of modems associated with an access server to a debug modem pool; allocating one or more remaining modems in the group to a session modem pool; thereafter determining whether an incoming call to the access server meets predefined fault isolation criteria; and, if so, then allocating a debug modem from the debug modem pool to the incoming call and initiating a fault isolation session; and if not, then allocating a session modem from the session modem pool to the incoming call and proceeding with a normal session. Preferably, the defined criteria include at least one match between one or more user attributes associated with the incoming call and one or more corresponding fault isolation session attributes stored within the network access server. The criteria themselves may be configurable, e.g. definable by the user. User attributes may include one or more of username, calling number (ANI) and called number (DNIS). The apparatus implements the method, preferably in the form of computer-readable software instructions residing in a memory and executed by a processor.

22 Claims, 2 Drawing Sheets

ACCESS SERVER FAULT ISOLATION WITHOUT SERVICE DISRUPTION METHOD AND APPARATUS

BACKGROUND OF THE INVENTION

Often, Internet service providers (ISPs) debug modem problems. It is desirable that, while the access server is in operation, customer engineers (CEs), system engineers (SEs) and/or customers are able to debug a modem problem without interrupting the service. Different modem allocation schemes exist. For example, on Cisco Systems, Inc.'s access servers, based on the allocation algorithm, the next modem in the queue is allocated to answer the call. This makes it difficult to debug the issue as it is unknown or difficult to predict in a heavily loaded access server which modem will be picked up next for answering the call. One known way to debug a modem problem is to busy-out all modems or at least all modems on a particular modem board and then to test each modem seriatim. Unfortunately, this approach can disrupt service for an undesirably long time.

SUMMARY OF THE INVENTION

The invention is a fault isolation method and apparatus for use in a network access server. The method includes allocating one or more modems in a group of modems associated with an access server to a debug modem pool; allocating one or more remaining modems in the group to a session modem pool; thereafter determining whether an incoming call to the access server meets predefined fault isolation criteria; and, if so, then allocating a debug modem from the debug modem pool to the incoming call and initiating a fault isolation session; and if not, then allocating a session modem from the session modem pool to the incoming call and proceeding with a normal session. Preferably, the defined criteria include at least one match between one or more user attributes associated with the incoming call and one or more corresponding fault isolation session attributes stored within the network access server. The criteria themselves may be configurable, e.g. definable by the user. User attributes may include one or more of username, calling number (ANI) and called number (DNIS). The apparatus implements the method, preferably in the form of computer-readable software instructions residing in a memory and executed by a processor.

DETAILED DESCRIPTION OF THE INVENTION

During a debugging session, it is desirable that, when a debugging call arrives from a CE/SE/customer (hereinafter, simply user), the call should be answered by a designated modem in a given access server. One or more such modems will be referred to herein as the "debug modem". Assigning one or more modems as debug modem will help collecting data/debugs from these modems without interrupting the service. The invention involves taking the debug modem out of the configured/default allocation scheme and using the debug modem only to answer the call which the CE/SE/customer is making or debugging. Calls which need to be routed to the debug modem can be uniquely identified based on one or more fields, e.g. automatic number identification (ANI), dialed number information service (DNIS), username, etc., or a debug call can be randomly sent to the debug modem. Criteria for sending the calls to the debug modem can be made configurable by the CE/SE/customer.

Figure 1:
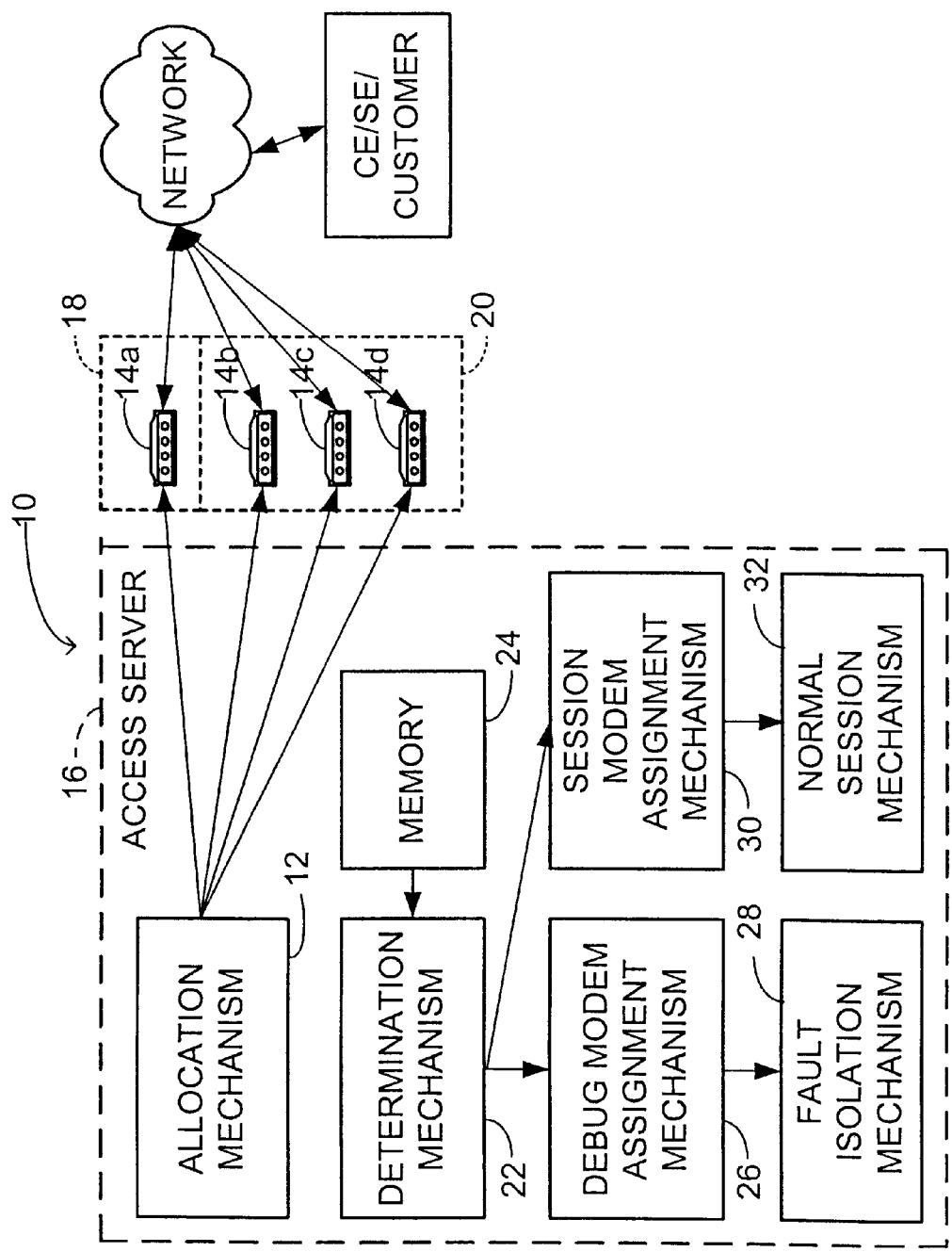
FIG. 1 is a schematic block diagram of the modem debug apparatus in accordance with a preferred embodiment of the invention.

FIG. 1 is a block diagram schematically illustrating the invented apparatus at 10 associated with a NETWORK and a CE/SE/USER. Apparatus 10 in a preferred embodiment of the invention includes an allocation mechanism or means 12 for allocating one or more modems 14a, 14b, 14c, 14d (the number of which typically may be far more or less than four) in a group of modems associated with an access server 16 to a debug modem pool 18 and for allocating one or more remaining modems in the group to a session modem pool 20. Apparatus 10 also may be seen preferably to include a determination mechanism or means 22 for determining whether an incoming call to access server 16 meets predefined fault isolation criteria. Preferably, such criteria include one or more matches between one or more user attributes, e.g. username, calling number and called number, and one or more corresponding fault isolation session attributes stored in a memory 24 within the network access server.

Determination mechanism 22 will be understood by those of skill in the art to be implemented in any suitable way, e.g. as simple comparison logic implemented in hardware or software. For example, such criteria and such user and corresponding session attributes may be stored in any suitable form such as data structures or arrays of fixed or variable length as may be defined within memory 24 and a simple Compare String instruction may be executed by a processor associated therewith. The fact of whether such criteria are met then simply may signal one or the other of the assignment mechanisms to be described. Those of skill in the art will appreciate that the user and session attributes and the criteria which govern the determination preferably are themselves configurable, i.e. they may be readily defined and/or changed at will by a system administrator, an internet service provider (ISP) or a user.

Within the spirit and scope of the invention, the determination mechanism may operate periodically or otherwise and even randomly or pseudo-randomly to initiate a debug session. In this case, the sole criterion is whether the access server deems it time to assign a given incoming call to a debug modem, with only partial regard to or complete disregard to whether there is one or more matches between one or more user attributes and corresponding session attributes. Accordingly, the invention provides great flexibility in network access server-associated network fault isolation.

Apparatus 10 also preferably includes an assignment mechanism or means 26 responsive to determining mechanism 22 for assigning a debug modem from debug modem pool 18 to the incoming call and initiating a fault isolation session, e.g. invoking a fault isolation mechanism or means 28, in case the incoming call meets the predefined fault isolation criteria. Finally, apparatus 10 preferably includes an assignment mechanism or means 30 for assigning a session modem from the session modem pool 20 to the incoming call and proceeding with a normal session, e.g. invoking or continuing operation of a normal session mechanism or means 32, in case the incoming call fails to meet the predefined fault isolation criteria.

Those of skill in the art will appreciate that the assignment of modems 14a, 14b, 14c, 14d from the group to either debug modem pool 18 or session modem pool 20 may be in any desirable ratio, although typically far fewer modems would be assigned to the debug than to the session pool. Assignment of modems to the debug modem pool might typically assume a fully or substantially fully functional modem, although modem assignment thereto may within the spirit and scope of the invention be arbitrary. Such an arbitrary assignment might facilitate quality assurance and maintenance and repair of the modems in the group.

Figure 2:
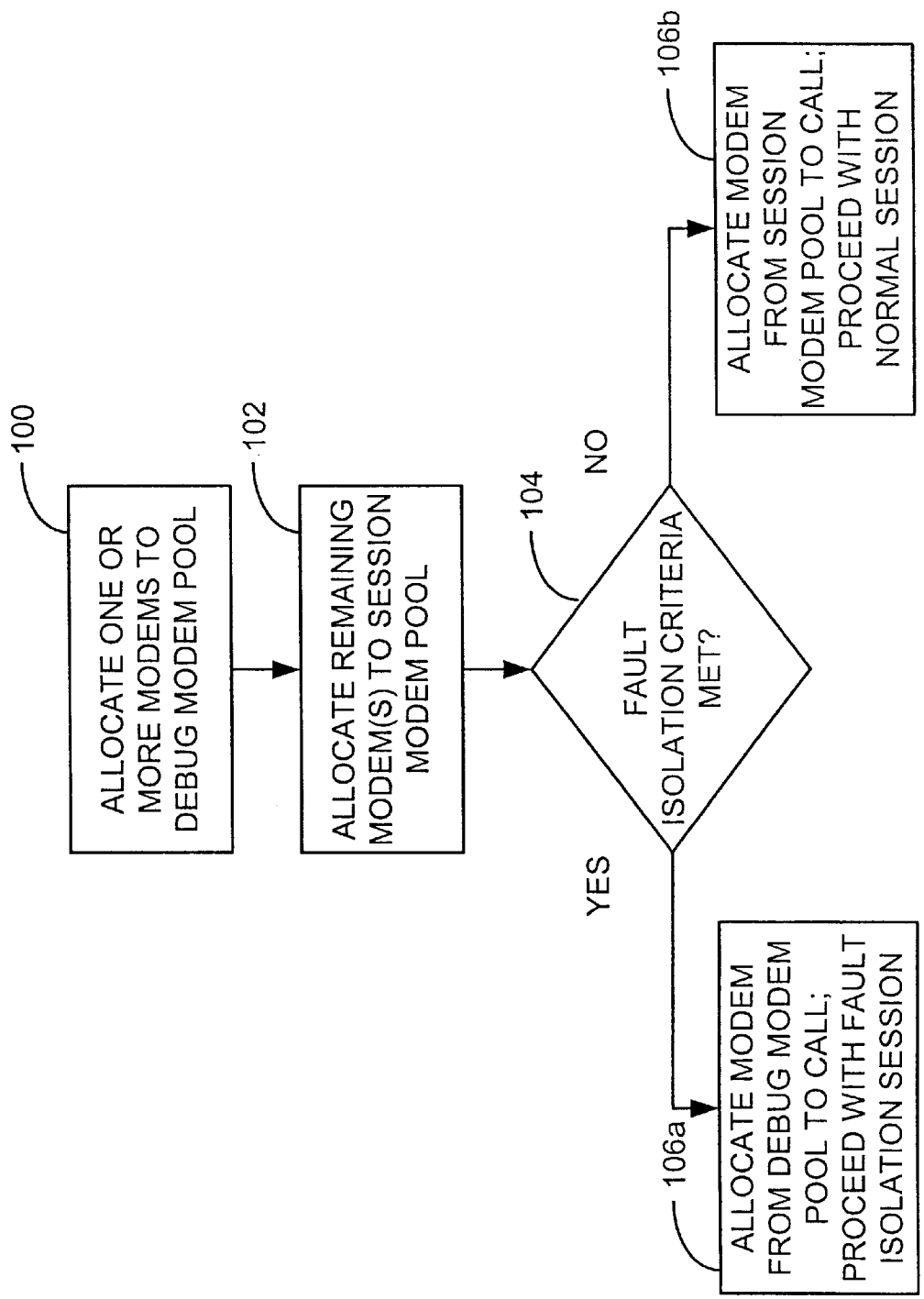
FIG. 2 is a flowchart illustrating the modem debug method in accordance with the preferred embodiment of the invention.

The invented method now may be understood by reference to FIG. 2. FIG. 2 illustrates the method as preferably including the following steps. At 100, one or more modems in a group of modems associated with an access server is allocated to a debug modem pool. At 102, one or more remaining modems in the group is allocated to a session modem pool, the session modem pool being different from the debug modem pool. At 104, it is determined whether an incoming call to the access server meets predefined fault isolation criteria. The criteria may be singular, e.g. it may be as simple as determining whether the incoming call's telephone number (caller number, as may be determined by examining the ANI), destination telephone number (called number, as may be determined by examining the DNIS) or username matches that of a user requesting fault isolation.

The criteria may be plural, e.g. it may require plural matches as between at least two defined user attributes and at least two corresponding fault isolation session attributes. Such criteria will be understood by those of skill in the art typically to be stored, e.g. in memory, within the network access server. For tighter security, the criteria may be that all defined user attributes associated with the incoming call and all corresponding defined fault isolation session attributes must match. Criteria other than or in addition to caller number, called number and username are contemplated, and are within the spirit and scope of the invention.

Referring still to FIG. 2, it may be seen that at 106a, if the fault isolation criteria are met, then a debug modem is allocated from the debug modem pool to the incoming call and a fault isolation session is initiated. A fault isolation session typically may include local network access server modem debugging, e.g. performing self-test or other diagnostic and fault isolation on the resident modem to determine if it is properly responsive and capable. Or the session may include end-to-end fault isolation diagnostics that may isolate the user (caller) modem as being unresponsive or incapable, or that may identify a network hardware or software problem with an intervening telephone line, PBX, switch, remote server node, etc. Within the spirit and scope of the invention, any and all such known fault isolation techniques, e.g. pinging, etc., may be used during the fault isolation session selectively invoked in accordance with the invention. (For example, if a modem is discovered to require maintenance, upgrade, or replacement, it may be de-allocated by the network access server from either modem pool and off-line servicing thereof may be scheduled.)

Finally, at 106b, if the fault isolation criteria are not met, then a session modem is allocated from the session modem pool to the incoming call and a normal session proceeds. Thus, those of skill in the art will appreciate that the invented fault isolation method selectively invokes fault isolation by selective allocation of one or the other of a session modem pool or a debug modem pool. Such selective allocation permits modems within the session modem pool to continue in normal operation and client service while one or more debug modems from the debug modem pool are used to address and attempt to solve a potential problem meeting predefined fault isolation criteria. Fault isolation and problem solving thus are rendered compatible with the continued provision of the highest possible level of normal client service with minimal impact.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A fault isolation method for use in a network access server, the method comprising:

allocating one or more modems in a group of modems associated with an access server to a debug modem pool;

allocating one or more remaining modems in the group to a session modem pool;

thereafter determining whether an incoming call to the access server meets predefined fault isolation criteria; and, if so, then allocating a debug modem from the debug modem pool to the incoming call and initiating a fault isolation session; and if not, then allocating a session modem from the session modem pool to the incoming call and proceeding with a normal session.

2. The method of claim 1, wherein the defined criteria include at least one match between one or more user attributes associated with the incoming call and one or more corresponding fault isolation session attributes stored within the network access server.

3. The method of claim 2, wherein the defined criteria are themselves configurable.

4. The method of claim 3, wherein the defined criteria are user configurable.

5. The method of claim 2, wherein the user attributes include one or more of username, calling number and called number.

6. The method of claim 1, wherein the defined criteria include plural matches between at least two defined user attributes associated with the incoming call and at least two corresponding defined fault isolation session attributes stored within the network access server.

7. The method of claim 6, wherein the defined criteria include matches between all defined user attributes associated with the incoming call and all corresponding defined fault isolation session attributes stored within the network access server.

8. The method of claim 7, wherein the defined user attributes and fault isolation attributes include one or more of username, calling number and called number.

9. The method of claim 1, wherein said determining is random or psuedo-random.

10. The method of claim 1, wherein said allocating of the one or more modems in a group of modems to a debug modem pool is based upon defined selection criteria including whether the one or more modems is substantially fully functional.

11. Apparatus for fault isolating communication problems at a network access server, the apparatus comprising:

an allocation mechanism for allocating one or more modems in a group of modems associated with an access server to a debug modem pool and for allocating one or more remaining modems in the group to a session modem pool;

means for determining whether an incoming call to the access server meets predefined fault isolation criteria, said means including machine-executable instructions stored in a memory;

means for assigning, responsive to said means for determining, a debug modem from the debug modem pool to the incoming call and initiating a fault isolation session, in case the incoming call meets the predefined fault isolation criteria; and means for assigning, responsive to said means for determining, a session modem from the session modem pool to the incoming call and proceeding with a normal session, in case the incoming call fails to meet the predefined fault isolation criteria.

12. The apparatus of claim 11, wherein said predefined fault isolation criteria include one or more matches between one or more user attributes associated with the incoming call and one or more corresponding fault isolation session attributes stored within the network access server.

13. The apparatus of claim 12, wherein the user attributes include one or more of username, calling number and called number.

14. The apparatus of claim 11, wherein said allocation mechanism allocates the one or more remaining modems to the session modem pool selectively based at least in part on whether the one or more modems is substantially fully functional.

15. A computer-readable medium containing a program for fault isolation in connection with a network access server, the program comprising:

instructions for allocating one or more modems in a group of modems associated with an access server to a debug modem pool;

instructions for allocating one or more remaining modems in the group to a session modem pool;

instructions for determining whether an incoming call to the access server meets predefined fault isolation criteria;

instructions for allocating a debug modem from the debug modem pool to the incoming call and initiating a fault isolation session in case the criteria are met; and instructions for allocating a session modem from the session modem pool to the incoming call and proceeding with a normal session in case the criteria are no met.

16. The computer-readable medium of claim 15, wherein the defined criteria include at least one match between one or more user attributes associated with the incoming call and one or more corresponding fault isolation session attributes stored within the network access server.

17. The computer-readable medium of claim 16, wherein the defined criteria are themselves definable.

18. The computer-readable medium of claim 17, wherein the definable criteria are user-definable.

19. The computer-readable medium of claim 16, wherein the user attributes include one or more of username, calling number and called number.

20. Apparatus for fault isolating communication problems at a network access server, the apparatus comprising:

an allocation mechanism for allocating one or more modems in a group of modems associated with an access server to a debug modem pool and for allocating one or more remaining modems in the group to a session modem pool;

a determining mechanism for determining whether an incoming call to the access server meets predefined fault isolation criteria, said determining mechanism including machine-executable instructions stored in a memory;

an assignment mechanism, responsive to said determining mechanism, for assigning a debug modem from the debug modem pool to the incoming call and initiating a fault isolation session, in case the incoming call meets the predefined fault isolation criteria; and an assignment mechanism, responsive to said determining mechanism, for assigning a session modem from the session modem pool to the incoming call and proceeding with a normal session, in case the incoming call fails to meet the predefined fault isolation criteria.

21. The apparatus of claim 20, wherein said predefined fault isolation criteria include one or more matches between one or more user attributes associated with the incoming call and one or more corresponding fault isolation session attributes stored within the network access server.

22. The apparatus of claim 21, wherein the user attributes include one or more of username, calling number and called number.

* * * * *